United States Patent
Crudele et al.

(10) Patent No.: US 11,163,811 B2
(45) Date of Patent: Nov. 2, 2021

(54) RANKING OF DOCUMENTS BASED ON THEIR SEMANTIC RICHNESS

(71) Applicant: INTERNATIONAL BUSINESS MACHINES CORPORATION, Armonk, NY (US)

(72) Inventors: Michele Crudele, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 15/796,950

(22) Filed: Oct. 30, 2017

(65) Prior Publication Data
US 2019/0130025 A1    May 2, 2019

(51) Int. Cl.
| | |
|---|---|
| *G06F 16/33* | (2019.01) |
| *G06F 16/93* | (2019.01) |
| *G06F 16/36* | (2019.01) |
| *G06F 16/31* | (2019.01) |

(52) U.S. Cl.
CPC ............ *G06F 16/334* (2019.01); *G06F 16/31* (2019.01); *G06F 16/33* (2019.01); *G06F 16/36* (2019.01); *G06F 16/93* (2019.01)

(58) Field of Classification Search
CPC ........ G06F 16/334; G06F 16/33; G06F 16/93; G06F 16/36; G06F 16/31
See application file for complete search history.

(56) References Cited

U.S. PATENT DOCUMENTS

| 2,606,778 A | 8/1952 | Myhre |
| 6,480,843 B2 | 11/2002 | Li |
| 8,060,501 B1 | 11/2011 | Harik |
| 8,122,043 B2 | 2/2012 | Buckley et al. |

(Continued)

FOREIGN PATENT DOCUMENTS

| CN | 102737018 A | * 10/2012 |
| CN | 106815252 A | 6/2017 |

(Continued)

OTHER PUBLICATIONS

Google Patents English Language Translation of Zhang (Year: 2012).*

(Continued)

*Primary Examiner* — Apu M Mofiz
*Assistant Examiner* — Farhad Agharahimi
(74) *Attorney, Agent, or Firm* — Steven M. Bouknight

(57) ABSTRACT

A solution is proposed for ranking a plurality of documents in a computing system, each of the documents comprising a plurality of document terms. A corresponding method comprises receiving a query comprising one or more query terms for selecting the documents, calculating corresponding similarity indexes between the query and the documents, each of the similarity indexes being calculated according to a comparison between the query terms and the document terms of the corresponding document, determining corresponding semantic richness indicators of the documents, adjusting the similarity indexes according to the corresponding semantic richness indicators, and ranking at least part of the documents for selection thereof according to the corresponding similarity indexes being adjusted.

14 Claims, 7 Drawing Sheets

(56) References Cited

U.S. PATENT DOCUMENTS

| | | | |
|---|---|---|---|
| 8,180,781 B2 | 5/2012 | Hiraoka | |
| 8,180,785 B2 | 5/2012 | Carmel et al. | |
| 8,606,778 B1 | 12/2013 | Harik | |
| 9,336,192 B1* | 5/2016 | Barba | G06F 40/30 |
| 9,390,161 B2 | 7/2016 | Shehata et al. | |
| 2005/0021517 A1* | 1/2005 | Marchisio | G06F 40/279 |
| 2007/0112867 A1 | 5/2007 | Evans et al. | |
| 2008/0250007 A1* | 10/2008 | Masuyama | G06F 16/313 |
| 2009/0190839 A1* | 7/2009 | Higgins | G06F 16/3347 382/209 |
| 2013/0297216 A1* | 11/2013 | Hirst | G16H 50/20 702/19 |
| 2014/0108006 A1* | 4/2014 | Vogel | G06F 40/40 704/9 |
| 2017/0011043 A1 | 1/2017 | Musuluri | |
| 2018/0300323 A1* | 10/2018 | Lee | G06Q 50/184 |

FOREIGN PATENT DOCUMENTS

| | | |
|---|---|---|
| CN | 107247743 A | 10/2017 |
| CN | 111194442 A | 5/2020 |
| DE | 1120180050765 T5 | 6/2020 |
| JP | 2006031209 A | 2/2006 |
| WO | 2016209975 A2 | 12/2016 |
| WO | 2019086996 A1 | 5/2019 |

OTHER PUBLICATIONS

Iwashita ("Assessed Levels of Second Language Speaking Proficiency: How Distinct?", Applied Linguistics, 29/1 pp. 24-49, Oxford University Press, 2008) (Year: 2008).*

Teufel, : "Lecture 4: Term Weighting and the Vector Space Model Information Retrieval Computer Science Tripos Part II", (https://www.cl.cam.ac.uk/teaching/1415/InfoRtrv/lecture4.pdf), 2014, pp. 1-80.

Singh et al., "Analysis of Vector Space Model in Information Retrieval", National Conference on Communication Technologies and its impact on Next Generation Computing CTNGC 2012, Proceedings published by International Journal of Computer Applications (IJCA), pp. 14-18.

International Searching Authority, "Written Opinion of the International Searching Authority", Patent Cooperation Treaty, dated Jan. 30, 2019, 8 pages, International Application No. PCT/I82018/058140.

* cited by examiner

RANKING OF DOCUMENTS BASED ON THEIR SEMANTIC RICHNESS

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The present disclosure relates to the information technology field. More specifically, this disclosure relates to the raking of documents.

Ranking of documents is commonplace in computing systems for selecting documents that may be relevant for any specific need; a typical example is in the context of Information Retrieval (IR), wherein the ranking is used to facilitate the identification of documents relating to different topics (such as web pages in the Internet by a search engine). Indeed, the selection of the relevant documents is an activity of empiric nature since it is not possible to prove mathematically that any document is more relevant than another one; therefore, the ranking of the documents is used to estimate their relevance and then to order, or sort, the documents accordingly (for example, for a manual selection thereof by human users).

In general, the ranking applies to a corpus (or collection) of documents, which is formed by a large number of documents each one comprising a sequence of terms (for example, words). A query for selecting desired documents comprises one or more terms that are deemed characterizing them (for example, submitted to the search engine by a user). A similarity index is calculated for each document according to a comparison between the terms of the query and the terms of the document. The documents are then ranked according to their similarity indexes for the selection of the desired ones (for example, by returning a list of the most relevant pages in decreasing order of their similarity indexes to the user for the manual selection of the ones that are actually of interest thereto).

A widespread technique for raking the documents is based on the Vector Space Model (VSM). Briefly, in the VSM technique each document and each query are indexed simply according to their terms and occurrences thereof. The document and the query are then represented by corresponding vectors in a multi-dimensional space (defined by the terms of a common vocabulary); if the term of each dimension is present in the document/query its value is set to a corresponding term weight. For example, the term weights are defined according to a tf-idf weighting scheme; particularly, the term weight of each term is set to the product of a term frequency tf (of the term in the document/query) by an inverse document frequency idf (of the term in the corpus of documents). The similarity index of the document with respect to the query is then calculated according to the angular difference of their vectors; in this way, the similarity index depends on the terms that are common, giving more significance to the terms that are repeated (according to their term frequencies) and/or are rare (according to their inverse document frequency).

The quality of any ranking technique depends on how well it is capable of selecting the documents (identified by the topmost ranked ones) that are actually relevant. For example, a precision (defined by the relevant documents that are selected with respect to the total number of the selected documents) should be as high as possible; indeed, it is desirable to limit (irrelevant) documents that are not relevant to the information need, i.e., false positive results (selecting no irrelevant documents ideally). At the same time, a recall (defined by the relevant documents that are selected with respect to the total number of the relevant documents) should be as high as possible; indeed, it is desirable to limit the relevant documents that are not selected, i.e., false negative results (selecting all the relevant documents ideally). More simply, the ranking technique should be capable of selecting some relevant documents; for example, this is the case when the ranking technique is applied to a browsing paradigm, based on a quick examination of the relevance of the selected documents that may or may not lead to a deeper examination thereof (such as when searching pages in the Internet); indeed, in this context the precision and the recall may be less important, provided that at least some of the selected documents are relevant.

A low quality of the ranking may adversely affect the performance of the computing system. Particularly, low precision and recall or simply low probability of selecting some relevant documents may require the submission of one or more additional queries for finding the documents that are actually relevant. These additional queries involve a corresponding additional consumption of resources of the computing system (for example, computational power for serving the additional queries, network traffic for receiving the additional queries and returning their results).

BRIEF SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of ranking the documents according to their semantic richness.

Particularly, an aspect provides a method for ranking a plurality of documents in a computing system, wherein corresponding similarity indexes between the documents and a query for selecting them are adjusted according to corresponding semantic richness indicators of the documents.

A further aspect provides a corresponding computer program for implementing the method.

A further aspect provides a corresponding computer program product for implementing the method.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

With reference in particular to FIG. 1A-FIG. 1E, the general principles are shown of the solution according to an embodiment of the present disclosure.

Figure 1A:
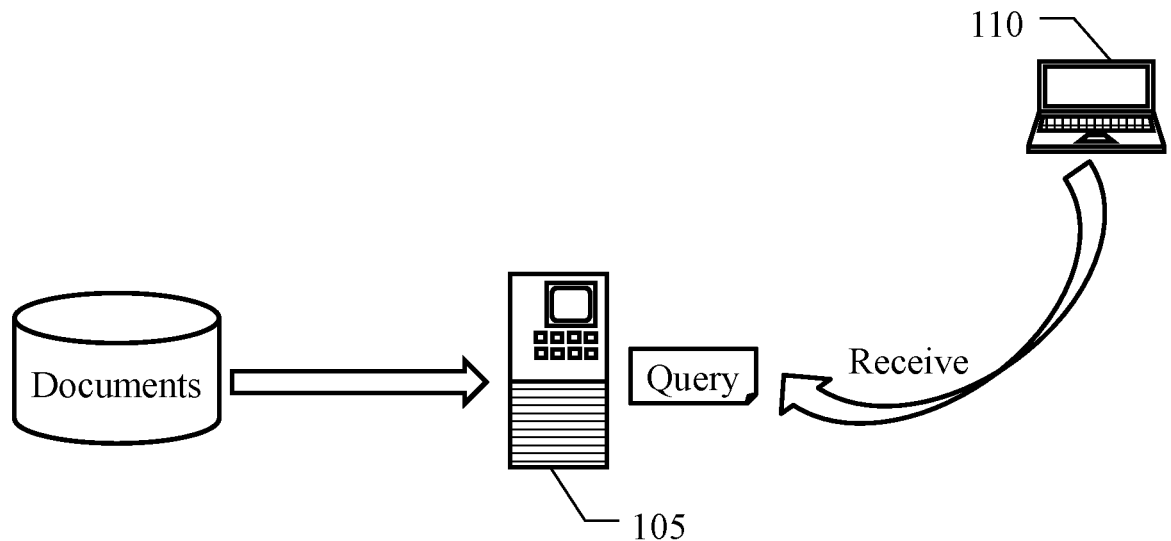
FIG. 1A-FIG. 1E show the general principles of the solution according to an embodiment of the present disclosure.

Starting from FIG. 1A, a corpus of documents is available in a computing system, for example, (web) pages in the Internet; each document comprises a plurality of (document) terms, for example, words of a corresponding text. A query is received in a computing machine, for example, in a (web) server computing machine, or simply server, 105 from a client computing machine, or simply client, 110 for selecting desired documents. The query comprises one or more (query) terms (deemed characterizing the desired documents) that are to be matched to the document terms of the documents of the corpus, for example, for searching the most relevant pages relating to a specific topic by a user of the client 110.

In response thereto, the following operations are performed to rank the documents according to their relevance. These operations are to be executed by a computing machine (i.e., the server 105 in the example at issue) since they are completely unsuitable for a human being. Indeed, this would require the reading of all the documents of the corpus (normally in a very high number, for example, of the order of billions of pages in the Internet); therefore, the time spent by a human being to do so would be so huge to make it absolutely impractical. Conversely, the reading of all the documents of the corpus is exactly what their ranking is aimed at avoiding. As a matter of fact, the purpose of this process is exactly to identify the documents that are supposed to be relevant automatically among their high number in the corpus, so as to allow the manual selection of the ones that are actually of interest in a relatively short time.

Figure 1B:
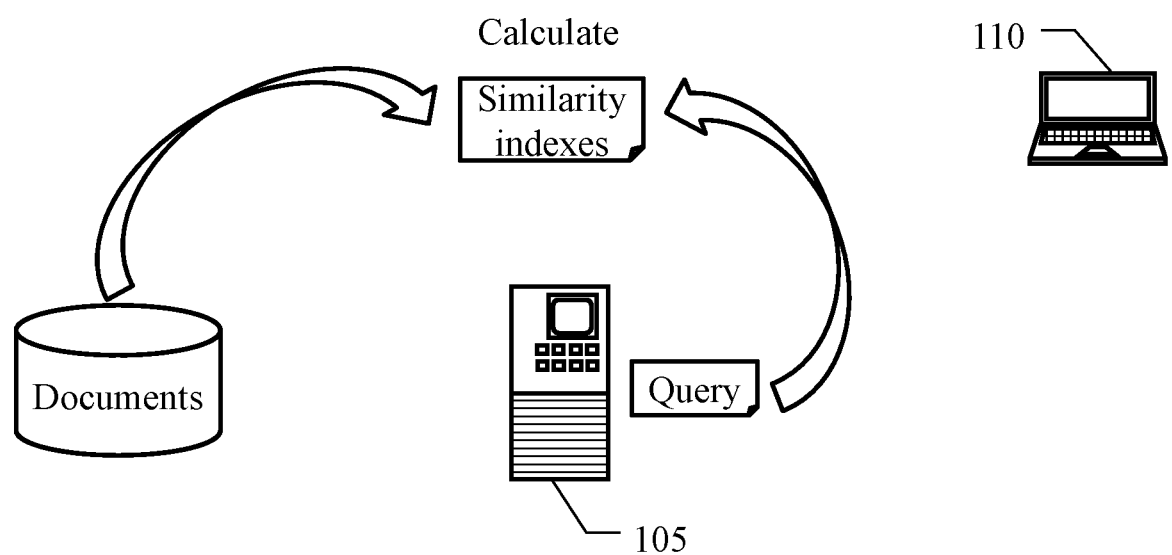

Moving to FIG. 1B, at the beginning a similarity index is calculated between the query and each document; the similarity index measures how much the document is (semantically) similar to the query (and then it is supposed to be relevant thereto), i.e., how much the meaning of the document has to do with the query (for example, defined by a numerical score from 1 to 0 in decreasing order of similarity). The similarity index is calculated according to a comparison between the query terms and the document terms of the document, for example, by applying the VSM technique.

Figure 1C:
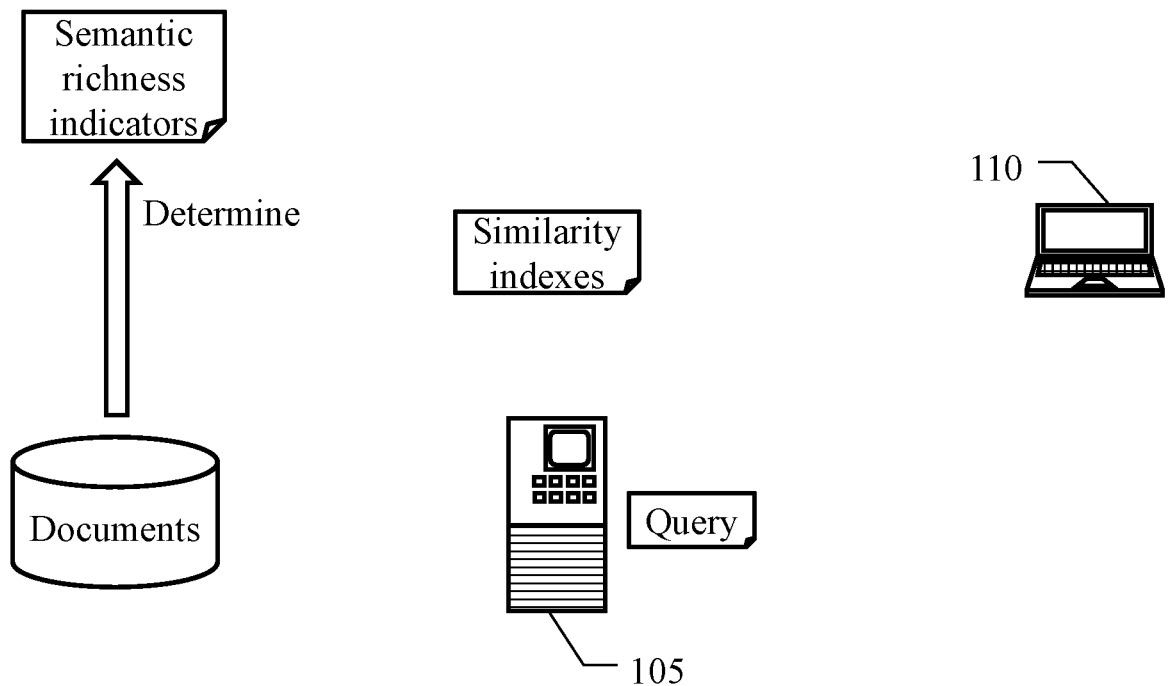

Moving to FIG. 1C, in the solution according to an embodiment of the present disclosure a semantic richness indicator is determined for each document. The semantic richness indicator measures an amount of information that the document is supposed to convey (i.e., its informativeness); in other words, the semantic richness indicator measures a cognitive content of the document, i.e., how much it is meaningfulness to express its concepts. For example, the semantic richness indicator of the document is calculated according to its document terms that are rare, or rare terms (such as defined by the document terms that are present in the documents of the corpus below a frequency threshold) and/or according to its syntactic complexity (such as defined by the number of verb phrases that are present in the document).

Figure 1D:
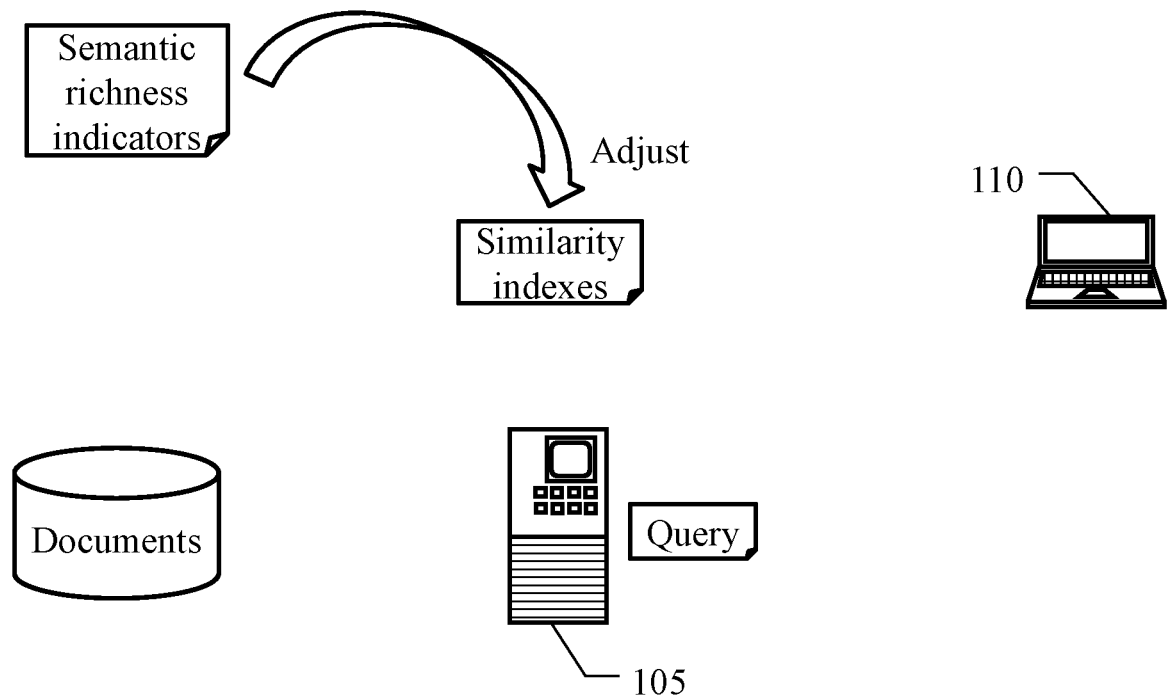

Moving to FIG. 1D, the similarity indexes of the documents (with respect to the query) are adjusted according the corresponding semantic richness indicators; for example, each similarity index is multiplied by a pivot normalizer function of the corresponding semantic richness indicator, so as to increase or decrease the similarity index when the semantic richness indicator is high or low, respectively.

Figure 1E:
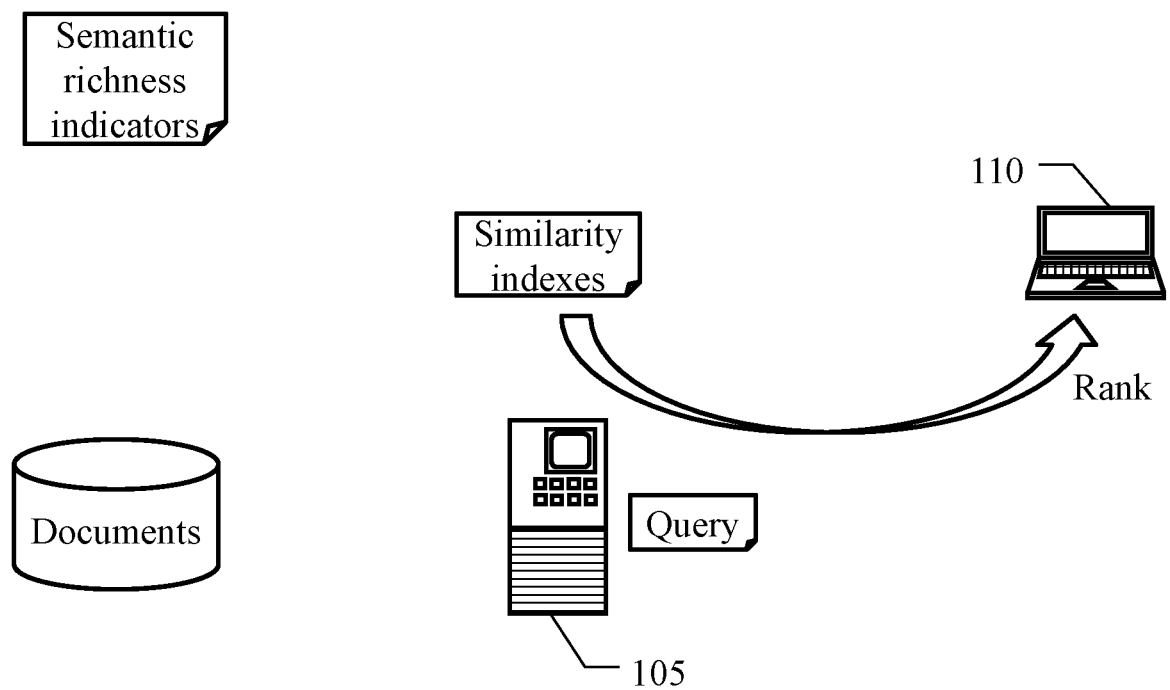

Moving to FIG. 1E, the documents or at least part thereof (for example, a predefined number of the most relevant ones) are ranked according to the corresponding (adjusted) similarity indexes. The ranking of the documents may then be used for their selection. For example, a list with the most relevant documents (arranged in decreasing order of their similarity indexes) is returned from the server 105 to the client 110 in response to the query; this list is then displayed on the client 110, so as to allow its user to browse the list from the top for selecting the documents that are actually of interest. The documents may then be examined by opening them; in the example at issue, this involves retrieving the pages from corresponding web sites in the Internet over a communication network and storing them temporarily into a cache memory of a web browser of the client 110. The pages may then be downloaded to the mass memory of the client 110 and possibly printed to facilitate their reading. Alternatively, the same process of ranking the documents may be applied to filtering applications, for example, in an anti-spam program of an e-mail server or an e-mail client. In this case, every e-mail that is received (by the e-mail server or the e-mail client) is verified against antispam rules predefined by an administrator or learned automatically from a behavior of a user (including corresponding query terms as above); whenever a content of the e-mail matches any of these antispam rules, the anti-spam program automatically identifies it as a spam. The anti-spam program may then flag the e-mail as spam (for its manual verification), may put the e-mail into quarantine or may delete the e-mail.

In this way, the ranking of the documents depends on their semantic richness as well, so as to inject cognitive reasoning capabilities into the corresponding process.

This significantly increases the quality of the ranking; for example, it is possible to increase the precision (thereby limiting the irrelevant documents that are selected), the recall (thereby limiting the relevant documents that are not selected) or simply the probability of selecting some relevant documents (for their browsing).

The above-described result may be achieved in a very simple way (for example, by maintaining the simplicity of the VSM technique).

Particularly, the semantic richness indicators of the documents (characterizing them independently of any queries) may be determined offline; therefore, the impact of the proposed solution on real-time performance (for responding to the queries) is negligible in practice.

All of the above significantly improves the performance of the computing system. Particularly, the resulting increased precision and recall or simply increased probability of selecting some relevant documents reduce the need of submitting additional queries for finding the documents that are actually relevant. This involves a corresponding reduction of consumption of resources of the computing system; for example, computational power of the server is saved (since no or at least reduced additional queries are to be served) and network traffic is reduced (since no or at least reduced additional queries are received by the server and their results are returned to the client).

Figure 2:
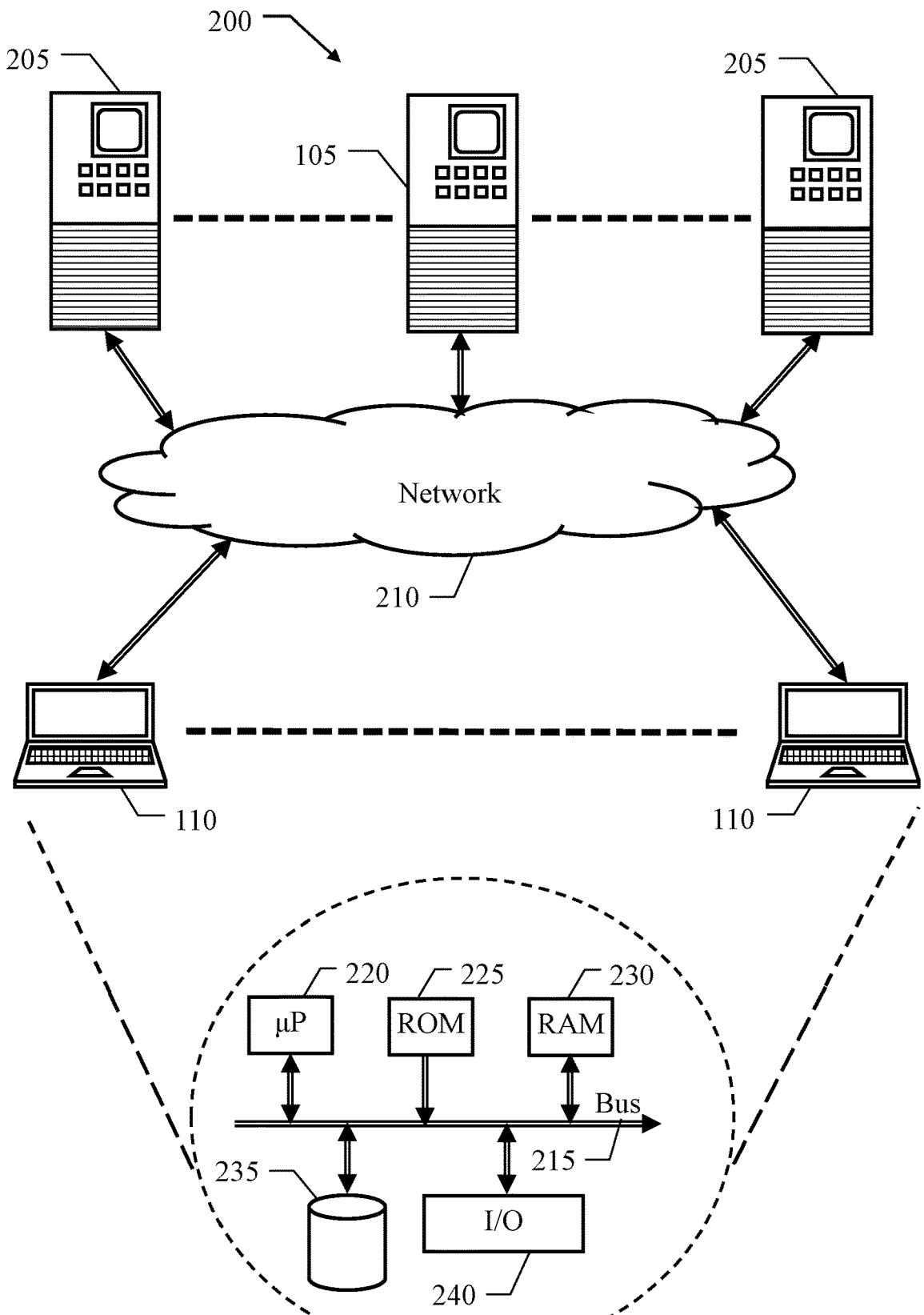
FIG. 2 shows a schematic block diagram of a computing system wherein the solution according to an embodiment of the present disclosure may be applied.

With reference now to FIG. 2, a schematic block diagram is shown of a computing system 200 wherein the solution according to an embodiment of the present disclosure may be applied.

The computing system 200 has a distributed architecture, typically based on the Internet; the Internet is formed by millions of servers 205, which are connected among them through a global telecommunication network 210. A subset of the servers 205 (known as World Wide Web or simply web), comprising the above-mentioned server 105 for ranking the documents, allows accessing corresponding web sites, each one comprising a collection of (web) pages; each page (defined by a hypertext document formatted in the HTML language) is identified by means of a corresponding URL (consisting of a unique string formatted according to a standard syntax for accessing it through the HTTP protocol). Users of the clients 110 access the Internet (through computing machines that operate as access providers, not shown in the figure), in order to exploit the services offered by the servers 205; particularly, as far as relevant to the present disclosure, the users of the clients 110 access the server 105 to search desired pages that may then be downloaded from the corresponding servers 205.

Each of the above-described computing machines of the system 200 (i.e., the servers 205 and the clients 110) comprises several units that are connected among them, for example, through a bus structure 215 with one or more levels. Particularly, one or more microprocessors (μP) 220 control operation of the computing machine 205,110; a non-volatile memory (ROM) 225 stores basic code for a bootstrap of the computing machine 205,110 and a volatile memory (RAM) 230 is used as a working memory by the microprocessors 220. The computing machine 205,110 is provided with a mass-memory 235 for storing programs and data (for example, storage devices of corresponding server farms wherein the servers 205 are implemented or hard disks for the clients 110). Moreover, the computing machine 205,110 comprises a number of controllers 240 for peripheral, or Input/Output (I/O), units; for example, the peripheral units of each server 205 comprise a Network Interface Card (NIC) for communicating with a switch/router subsystem of the corresponding server farm providing access to the (global telecommunication) network 210 and a drive for reading/writing removable storage units (such as optical disks, like DVDs) implemented by a console of the server farm, whereas the peripheral units of each client 110 comprises a monitor, a keyboard, a mouse, a Wireless NIC (WNIC) such as of the Wi-Fi type for accessing the network 210 (through the corresponding access provider).

Figure 3:
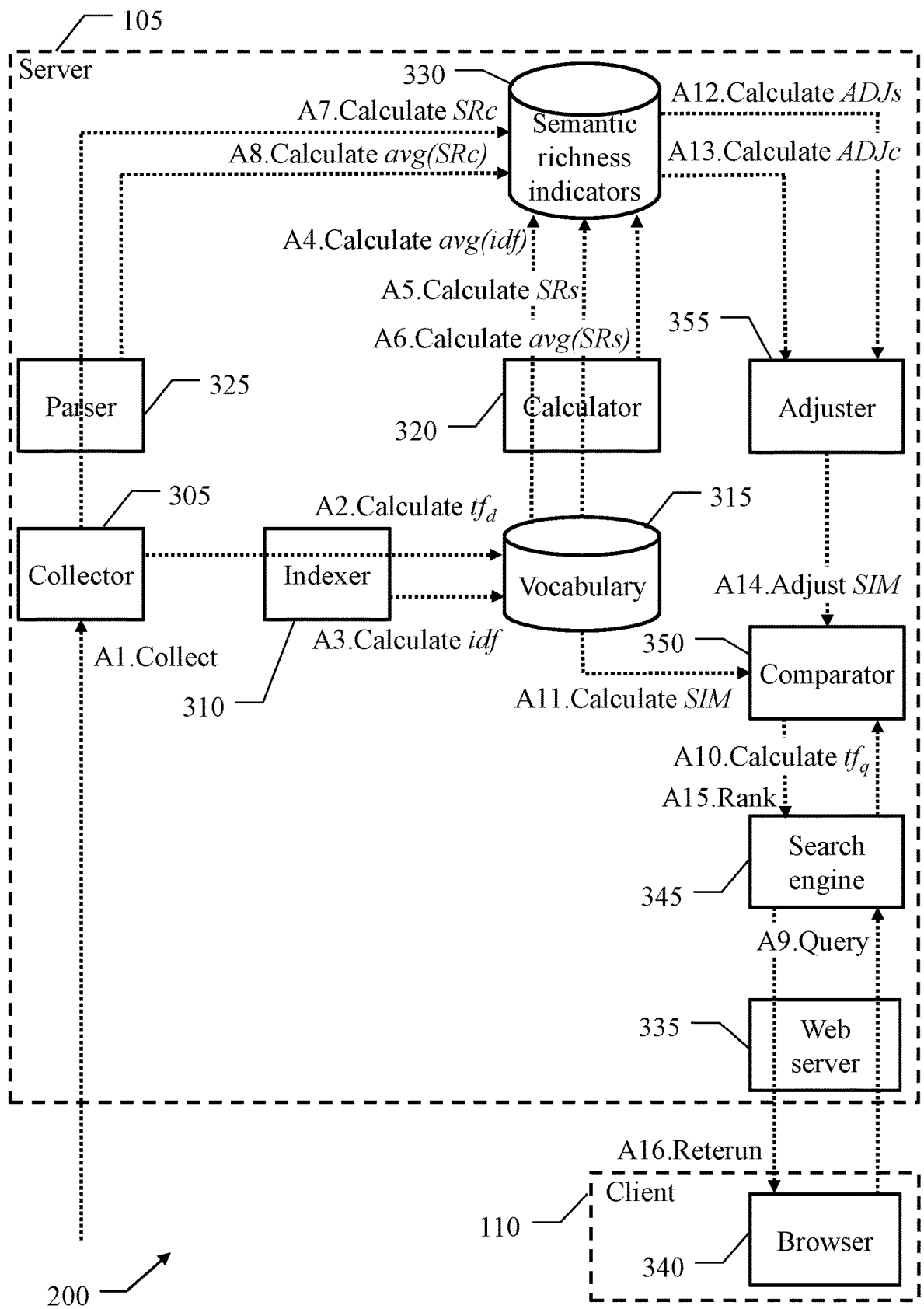
FIG. 3 shows a collaboration diagram representing the roles of the main software components that may be used to implement the solution according to an embodiment of the present disclosure.

With reference now to FIG. 3, a collaboration diagram is shown representing the roles of the main software components that may be used to implement the solution according to an embodiment of the present disclosure.

All the software components (programs and data) are denoted as a whole with the reference 300. The software components 300 are typically stored in the mass memory and loaded (at least partially) into the working memory of each computing machine when the programs are running, together with an operating system and other application programs (not shown in the figure). The programs are initially installed into the mass memory, for example, from removable storage units or from the network. Particularly, the diagram represents both the static structure of the software components 300 and their dynamic behavior by means of a series of exchanged messages, each one representing a corresponding action (denoted with sequence numbers preceded by the symbol "A") that may correspond to one or more executable instructions (of a module, segment or portion of code) for implementing the specified logical function on the corresponding computing machine.

Particularly, the server 105 comprises the following components. A collector 305 collects any new document to be included in the corresponding corpus; for example, the collector 305 is a web crawler (or spider) that downloads at least part of the pages that have been added or updated in the Internet—action "A1.Collect". An indexer 310 indexes the documents of the corpus for their ranking. For example, the indexer 310 applies a "bag of words" model, wherein each document is simply represented by its terms, disregarding their order (but considering their multiplicity). For this purpose, the indexer 310 accesses (in read/write mode) a vocabulary repository 315, which stores information relevant to the corpus of documents into an inverted index data structure (mapping from contents to locations). Particularly, the vocabulary repository 315 comprises corresponding entries for all the terms of a (common) vocabulary of the corpus of documents, each one storing a list with information relating to the documents wherein the term appears. Any time the corpus of documents changes, either because any new document has been added or any (old) document has been removed, the indexer 310 accordingly updates the vocabulary repository 315. Particularly, for the new document the indexer 310 determines a term frequency $tf_{t,d}$ of each term t of the (new) document d equal to a repetition of the term t in the document d (normalized according to its length):

$$tf_{t,d} = T_{t,d}/T_d,$$

with $T_{t,d}$ the number of times the term t appears in the document d and $T_d$ the total number of terms that are present in the document d (and then $0 < tf_{t,d} \leq 1$). The term frequency $tf_{t,d}$ increases with the repetition of the term t in the document d; therefore, the term frequency $tf_{t,d}$ represents an importance of the term t in the document d. For each term t of the document d, the indexer 310 saves the term frequency $tf_{t,d}$ of the term t in association with an identifier of the document d (for example, the URL of the page) into the entry of the term t in the vocabulary repository 315, creating it when necessary (conversely, for the old document the indexer 310 removes the corresponding information from the vocabulary repository 315)—action "A2.Calculate $tf_d$". In any case (whenever the corpus of document changes) the indexer 310 calculates an inverse document frequency $idf_t$ of each term t of the corpus of documents that has been affected by the change (because the new document or the old document contains it). The inverse document frequency $idf_t$ is equal to the inverse fraction in logarithmic scale of the documents wherein the term t appears:

$$idf_t = \log_{10}(D/df_t),$$

with D the number of documents in the corpus and $df_t$ the number of documents wherein the term t appears (and then $idf_t \geq 0$). The inverse document frequency $idf_t$ is very low when the term t is common, down to $idf_t = 0$ when the term t is present in all the documents of the corpus, whereas the more rare the term t the higher its inverse document frequency $idf_t$; therefore, the inverse document frequency $idf_t$ represents a specificity of the term t in general. The indexer 310 saves each inverse document frequency $idf_t$ so calculated into the entry of the corresponding term tin the vocabulary repository 315—action "A3.Calculate idf".

In the solution according to an embodiment of the present disclosure, a calculator 320 and/or a (syntactic) parser 325 determine corresponding components of the semantic richness indicators of the documents of the corpus for adjusting their similarity indexes. For this purpose, the calculator 320 and the parser 325 access (in read/write mode) a document richness repository 330, which stores information relevant thereto.

Particularly, any time the corpus of documents changes the calculator 320 calculates a specificity threshold of the terms t of the corpus of documents, equal to the average avg(idf) of their inverse document frequencies $idf_t$ (extracted from the vocabulary repository 315):

$$avg(idf) = \frac{\sum_{i=1}^{T} idf_i}{T},$$

with T the total number of terms t that are present in the corpus of documents. The terms t having their inverse document frequency $idf_t$ higher than the average avg(idf) are more rare and then specific, whereas the terms t having their inverse document frequency $idf_t$ lower than the average avg(idf) are more common and then generic. The calculator 320 saves the average avg(idf) of the inverse document frequencies $idf_t$ into the document richness repository 330—action "A4.Calculate avg(idf)". Moreover, for each new document the calculator 320 calculates a specificity component of its semantic richness indicator (referred to as specificity indicator). The specificity indicator $SRs_d$ of the (new) document d is equal to the number of terms t thereof that are rare (normalized according to the length of the document d:

$$SRs_d = Ns_{t,d}/T_d,$$

with $Ns_{t,d}$ the number of rare terms t in the document d, i.e., its terms t having their inverse document frequencies $idf_t$ (possibly strictly) higher than the average avg(idf) thereof, and $T_d$ again the total number of terms that are present in the document d (and then $0 \le SRs_d \le 1$). The higher the density of rare terms tin the document d the higher its specificity indicator $SRs_d$; therefore, the specificity indicator $SRs_d$ represents a lexical variety of the document d. The calculator 320 saves the specificity indicator $SRs_d$ of the document d into an entry for the document d in the richness document repository 330 (indicated by its identifier), creating it when necessary (conversely, for the old document the calculator 320 removes the corresponding information from the semantic richness repository 330)—action "A5.Calculate SRs". In any case (whenever the corpus of document changes) the calculator 320 calculates the average avg(SRs) of the specificity indicators $SRs_d$ of the corpus of documents:

$$avg(SRs) = \frac{\sum_{i=1}^{D} SRs_i}{D},$$

with D again the number of documents in the corpus. The calculator 330 saves the average avg(SRs) of the specificity indicators $SRs_d$ into the document richness repository 330—action "A6.Calculate avg(SRs)".

In addition or in alternative, for each new document the parser 325 parses the new document for identifying its phrases (i.e., any groups of one or more words defining a complete grammatical unit of a sentence according to a syntax of the corresponding language), comprising its verb phrases (i.e., any phrases composed of at least one verb and its dependents); for example, this result is achieved by applying a Natural Language Processing (NLP) Part-Of-Speech (POS) tagging, wherein information about each part of speech is added in the form of tags. The parser 325 then calculates a complexity component of the semantic richness indicator (referred to as complexity indicator) of the new document. The complexity indicator $SRc_d$ of the (new) document d is equal to the number of verb phrases of the document d (normalized according to its length):

$$SRc_d = N_{VP,d}/VP_d,$$

with $N_{VP,d}$ the number of verb phrases in the document d and $VP_d$ the number of (unique) phrases in the document d (and then $0 \le SRc_d \le 1$). The higher the number of verb phrases in the document d the higher its complexity indicator $SRc_d$; therefore, the complexity indicator $SRc_d$ quantifies a syntactic complexity of the document d representing its expressivity. The parser 325 saves the complexity indicator $SRc_d$ of the document d into the corresponding entry in the richness document repository 330 (conversely, for the old document the parser 325 removes the corresponding information from the semantic richness repository 330)—action "A7.Calculate SRc". In any case (whenever the corpus of document changes) the parser 325 calculates the average avg(SRc) of the complexity indicators $SRc_d$ of the corpus of documents:

$$avg(SRc) = \frac{\sum_{i=1}^{D} SRc_i}{D},$$

with D again the number of documents in the corpus. The parser 325 saves the average avg(SRc) of the complexity indicators $SRc_d$ into the document richness repository 330—action "A8.Calculate avg(SRc)".

As usual, a web server 335 processes any requests that are submitted to the server 105 by the clients 120 (only one shown in the figure) accessing it with a browser 340 (generally used to surf the Internet). As far as relevant to the present disclosure, the user of the client 120 types and then submits queries for searching documents; each query is defined by one or more terms (for example, keywords) that the user deems adapted to identify the content of the documents that are desired. The browser 340 submits the query to the web server 335, which in turn passes it to a (web) search engine 355—action "A9.Query".

The search engine 350 exploits a comparator 350, which calculates the similarity index between each document of the corpus and the query by means of the VSM technique. For this purpose, the comparator 350 determines the term frequency $tf_{t,q}$ of each term t of the query q, likewise equal to the repetition of the term tin the query q normalized according to its length:

$$tf_{t,q} = T_{t,q}/T_q,$$

with $T_{t,q}$ the number of times the term t appears in the query q and $T_q$ the total number of terms that are present in the query q (and then $0<tf_{t,q}\leq 1$)—Action "A10.Calculate $tf_q$". The comparator 355 then calculates a tf-idf weight $w_{t,d}$ of each term t of the document d, equal to the product of the term frequency $tf_{t,d}$ of the term t in the document d by the inverse document frequency $idf_t$ of the term t in the corpus of documents (extracted from the vocabulary repository 315):

$$w_{t,d}=tf_{t,d}\cdot idf_t.$$

The tf-idf$_t$ weight $w_{t,d}$ represents an actual significance of the term t in the document d according to a combination of a local parameter depending on the document d only (the term frequencies $tf_{t,d}$) and a global parameter depending on the whole corpus of documents (the inverse document frequency $idf_t$); particularly, the tf-idf weight $w_{t,d}$ increases with the repetition of the term t in the document d (proportionally) and/or with how rare the term t is in the corpus of documents (logarithmically so as to dump its effect). Likewise, the comparator 350 calculates the tf-idf weight $w_{t,q}$ of each term t of the query q (equal to the product of the term frequencies $tf_{t,q}$ of the term t in the query q by the inverse document frequency $idf_t$ of the term t in the corpus of documents):

$$w_{t,q}=tf_{t,q}\cdot idf_t.$$

The document d and the query q are then represented in a T-dimensional vector space (with a number of dimensions equal the total number T of terms t that are present in the corpus of documents). The terms t are the axis of the vector space, whereas the document d and the query q define a document vector $\vec{d}$ and a query vector $\vec{q}$, respectively, which are identified by the points indicated by the corresponding tf-idf weights $w_{t,d}$ and $w_{t,q}$, respectively (set to 0 when the terms t are not present in the document d or in the query q). At this point, the comparator 350 calculates the similarity index between the query q and the document d according to the angular difference of their vectors (depending on their terms t that are common). Particularly, the similarity index SIM(q,d) is set to the cosine of the angle θ between the document vector $\vec{d}$ and the query vector $\vec{q}$, equal to the scalar product of the vectors $\vec{d}$ and $\vec{q}$ being length normalized:

$$SIM(q,d)=\cos(\theta)=\frac{\vec{q}\cdot\vec{d}}{|\vec{q}|\cdot|\vec{d}|}=\frac{\sum_t w_{t,q}\cdot w_{t,d}}{\sqrt{\sum_t w_{t,q}^2}\cdot\sqrt{\sum_t w_{t,d}^2}}.$$

The similarity index SIM(q,d) decreases monotonically with the angle θ from 1 when the vectors $\vec{d}$ and $\vec{q}$ are aligned (meaning that the document d is very similar to the query q since all the terms t of the query q are present in the document d) to 0 when the vectors $\vec{d}$ and $\vec{q}$ are orthogonal (meaning that the document d is very different from the query q since no term t of the query q is present in the document d)—action "A11.Calculate SIM".

In the solution according to an embodiment of the present disclosure, an adjuster 355 adjusts the similarity indexes of the documents of the corpus according to their semantic richness. Particularly, the adjuster 355 calculates a specificity (adjusting) factor $ADJs_d$ of each document d of the corpus, equal to the pivot normalizer function of its specificity indicator $SRs_d$ (extracted from the document richness repository 330):

$$ADJs_d=1-k+k\cdot SRs_d/\text{avg}(SRs),$$

where k is a tuning parameter (with $0<k\leq 1$). The specificity factor $ADJs_d$ is equal to 1 when the specificity indicator $SRs_d$ of the document d is equal to its average avg(SRs), whereas it is higher than 1 when the specificity indicator $SRs_d$ of the document d is higher than its average avg(SRs) and it is lower than 1 when the specificity indicator $SRs_d$ of the document d is lower than its average avg(SRs); the tuning parameter k emphasizes the effect of the specificity indicator $SRs_d$ on the specificity factor $ADJs_d$ (from null when k=0 to maximum when k=1)—action "A12.Calculate ADJs".

In addition or in alternative, likewise the adjuster 355 calculates a complexity (adjusting) factor $ADJc_d$ of each document d of the corpus, equal to the pivot normalizer function of its complexity indicator $SRc_d$ (extracted from the document richness repository 330):

$$ADJc_d=1-k'+k'\cdot SRc_d/\text{avg}(SRc),$$

with k' a tuning parameter either the same as or different from above (with $0<k'\leq 1$). In this case as well, the complexity factor $ADJc_d$ is equal to 1 when the complexity indicator $SRc_d$ of the document d is equal to its average avg(SRc), whereas it is higher than 1 when the complexity indicator $SRc_d$ of the document d is higher than its average avg(SRc) and it is lower than 1 when the complexity indicator $SRc_d$ of the document d is lower than its average avg(SRc); the tuning parameter k' again emphasizes the effect of the complexity indicator $SRc_d$ on the complexity factor $ADJc_d$ (from null when k=0 to maximum when k=1)—action "A13.Calculate ADJc".

At this point, the adjuster 355 adjusts the similarity index SIM(q,d) of each document d with respect to the query q (previously calculated by the comparator 350) multiplying it by the specificity factor $ADJs_d$, by the complexity factor $ADJc_d$ or by both of them (according to a configuration of the adjuster 355):

$$SIM(q,d)=ADJs_d\cdot SIM(q,d),$$

$$SIM(q,d)=ADJc_d\cdot SIM(q,d) \text{ or}$$

$$SIM(q,d)=ADJs_d\cdot ADJs_d\cdot SIM(q,d).$$

In this way, the similarity index SIM(q,d) of each document d that has its specificity factor $ADJs_d$ higher than 1 (since it is more lexically varying) and/or has its complexity factor $ADJc_d$ higher than 1 (since it is more syntactically complex) increases, whereas the similarity index SIM(q,d) of each document d that has its specificity factor $ADJs_d$ lower than 1 (since it is less lexically varying) and/or has its complexity factor $ADJc_d$ lower than 1 (since it is less syntactically complex) decreases (with the similarity index SIM(q,d) of each document d that has its specificity factor $ADJs_d$ and complexity factor $ADJc_d$ equal to 1 that remains unchanged). The choice of the different adjustments of the similarity index SIM(q,d) described above is a tradeoff between the opposed requirements of simplicity and accuracy (in any case, with the additional requirements in term of computational resources, especially for the determination of the complexity factors $ADJc_d$, which should not be problematic in practice, since the corresponding operations are performed offline)—action "A14.Adjust SIM".

At this point, as usual the search engine 345 ranks the documents of the corpus in decreasing order for their (possibly updated) similarity indexes SIM(q,d); the search engine 345 then selects the documents with the higher similarity indexes SIM(q,d) (for example, the first 10-20), which should be the most relevant to the query q—action "A15.Rank". The search engine 345 now returns a list of the (most relevant) documents so selected to the client 120 (through the web server 335) as a response to the query q; the browser 340 of the client 120 receives this list and displays it onto its monitor, so as to allow the user to select the documents that are actually of interest (if any)—action "A16.Return".

Figure 4A:
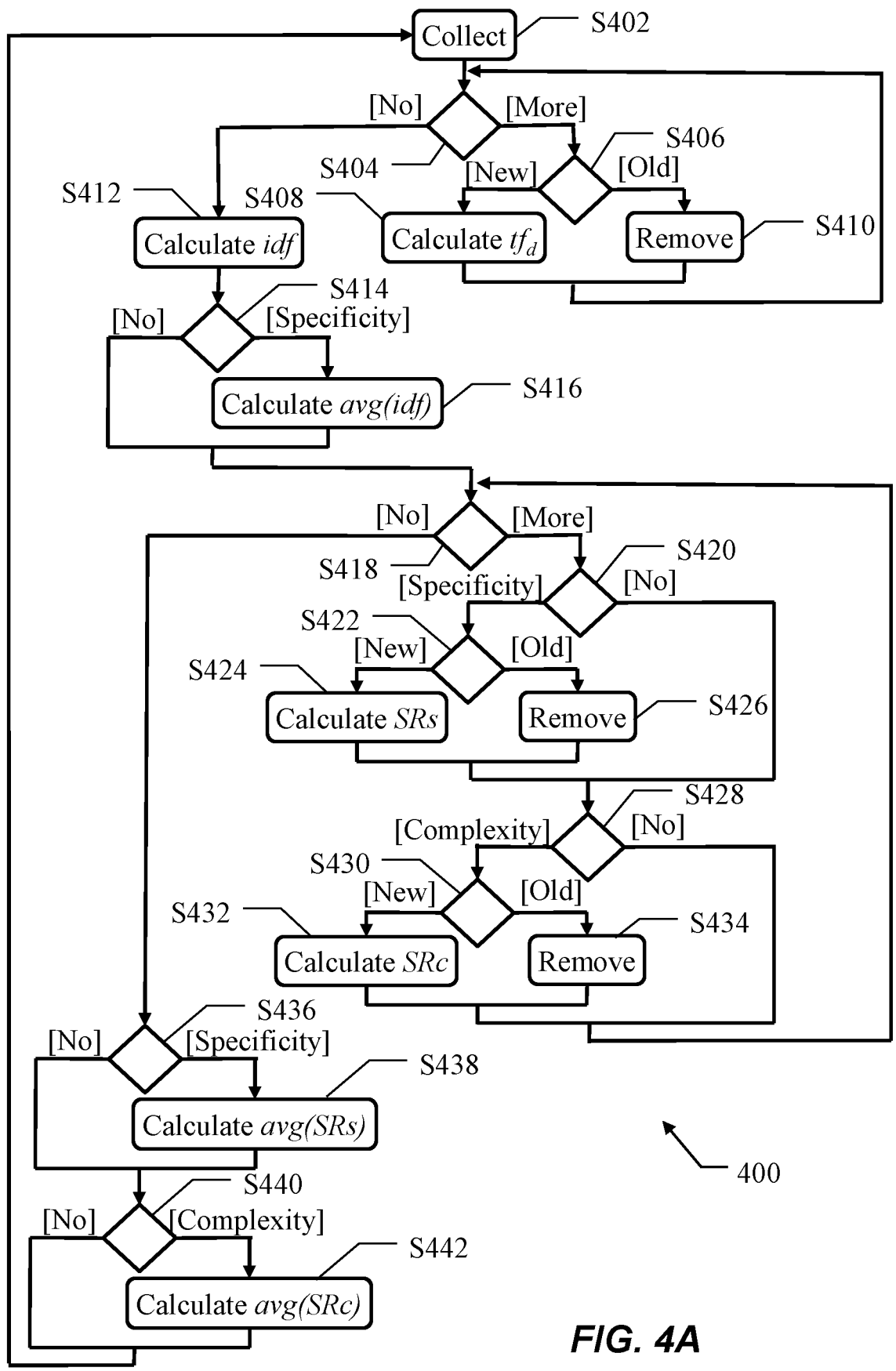
FIG. 4A-FIG. 4B show an activity diagram describing the flow of activities relating to an implementation of the solution according to an embodiment of the present disclosure.
Figure 4B:
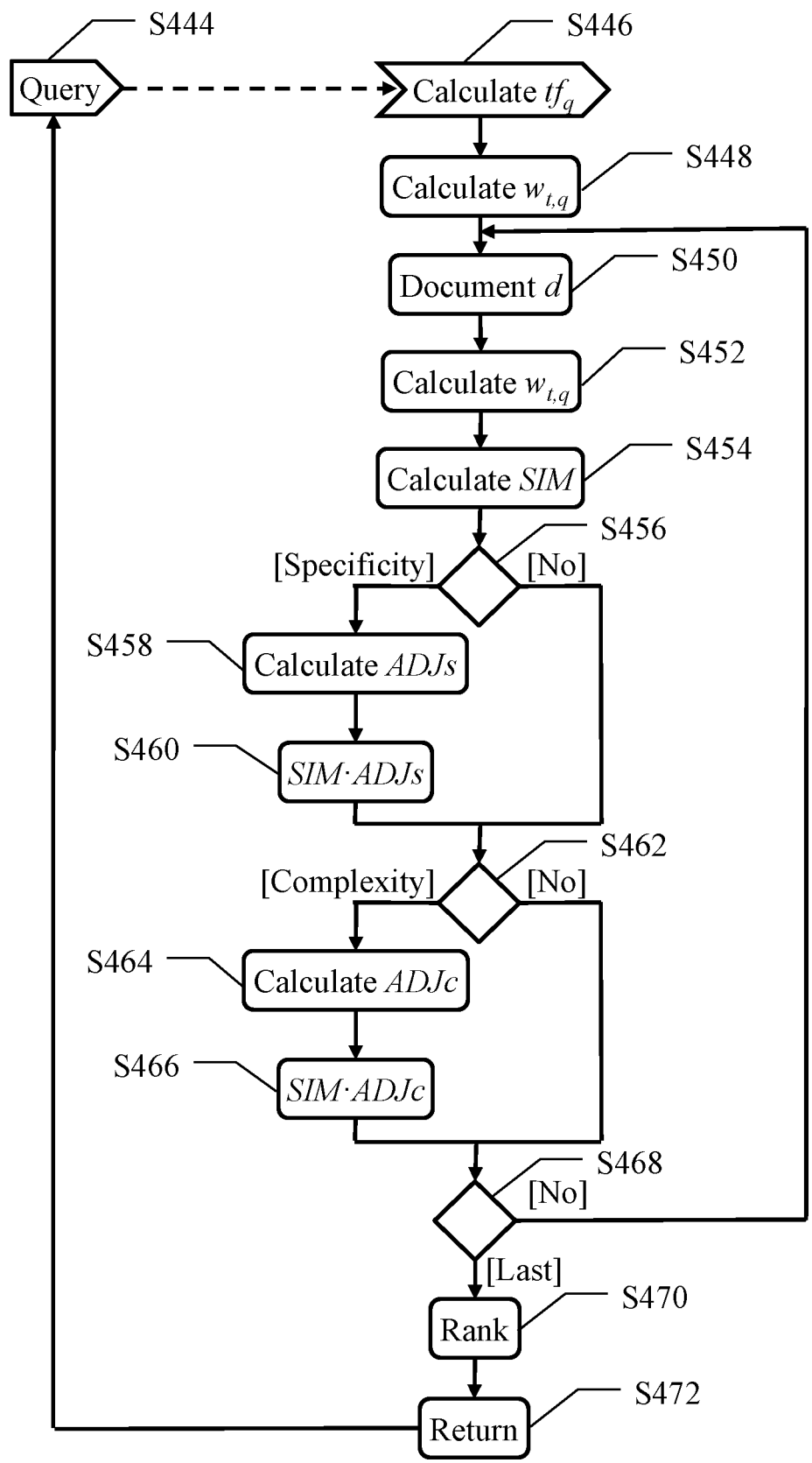

With reference now to FIG. 4A-FIG. 4B, an activity diagram is shown describing the flow of activities relating to an implementation of the solution according to an embodiment of the present disclosure.

Particularly, the diagram represents an exemplary process that may be used to rank documents with a method 400. In this respect, each block may correspond to one or more executable instructions for implementing the specified logical function on the server.

A loop is performed continually for indexing the corpus of documents, starting at block S402 wherein the collector collects any new document to be included in the corpus (for example, by downloading at least part of the pages that have been added or updated in the Internet with respect to a previous iteration of the loop). An inner loop is then performed for processing any new documents (added or updated) or any old documents (deleted) by the indexer. For this purpose, the indexer at block S404 verifies whether any new/old document is still to be processed by it. If so, the flow of activity branches at block S406 according to the type of the document to be processed. If the document is new (i.e., it has been added or updated) the indexer at block S408 determines the term frequency $tf_{t,d}$ of each term t of the new document and saves it in association with the identifier of the new document d into the entry of the term t in the vocabulary repository (creating it when necessary). Conversely, if the document is old (i.e., it has been deleted) the indexer at block S410 removes the corresponding information from the vocabulary repository. In both case, the process then returns to the block S404; as soon as no new/old document is still to be processed (immediately when the corpus of documents has not changed with respect to the previous iteration of the loop) the process descends into block S412. At this point, the indexer calculates the inverse document frequency $idf_t$ of each term t of the corpus of documents that has been affected by its change, if any (because any new/old document contains it) and saves each inverse document frequency $idf_t$ so calculated into the entry of the corresponding term t in the vocabulary repository.

In the solution according to an embodiment of the present disclosure the flow of activity branches at block S414 according to a configuration of the search engine. If the search engine is configured to define the semantic richness indicators of the documents according to their specificity indicators, the calculator at block S416 calculates the average avg(idf) of the inverse document frequencies $idf_t$ of the terms t of the corpus of documents, and saves it into the document richness repository.

The process then continues to block S418 from the block S416 or directly from the block S414 when the search engine is not configured to define the semantic richness indicators of the documents according to their specificity indicators. A further inner loop is now performed for determining corresponding components of the semantic richness indicators of the documents of the corpus. For this purpose, at this point the calculator verifies whether any new/old document with respect to a previous iteration of the loop is still to be processed by it. If so, the flow of activity branches at block S420 according to the configuration of the search engine. If the search engine is configured to define the semantic richness indicators of the documents according to their specificity indicators, the flow of activity branches again at block S422 according to the type of the document to be processed. If the document is new, the calculator at block S424 calculates the specificity indicator $SRs_d$ of the new document d, and saves it into the entry for the document d in the richness document repository (creating it when necessary). Conversely, if the document is old the calculator at block S426 removes the corresponding information from the semantic richness repository. The flow of activity merges again at block S428 from the block S424, from the block S426 or directly from the block S420 when the search engine is not configured to define the semantic richness indicators of the documents according to their specificity indicators. At this point, the flow of activity further branches according to the configuration of the search engine. If the search engine is configured to define the semantic richness indicators of the documents according to their complexity indicators, the flow of activity again branches at block S430 according to the type of the document to be processed. If the document is new, the parser at block S432 calculates the complexity indicator $SRc_d$ of the new document d (by parsing the new document for identifying its phrases, comprising its verb phrases), and saves it into the corresponding entry in the richness document repository. Conversely, if the document is old the parser at block S434 removes the corresponding information from the semantic richness repository.

The process then returns to the block S418 from the block S432, from the block S434 or directly from the block S428 when the search engine is not configured to define the semantic richness indicators of the documents according to their complexity indicators; as soon as no new/old document is still to be processed (immediately when the corpus of documents has not changed with respect to the previous iteration of the loop) the process descends into block S436. At this point, the flow of activity further branches according to the configuration of the search engine. If the search engine is configured to define the semantic richness indicators of the documents according to their specificity indicators, the calculator at block S438 calculates the average avg(SRs) of the specificity indicators $SRs_d$ of the corpus of documents, and saves it into the document richness repository. The process then continues to the block S440 from the block S438 or directly from the block S436 when the search engine is not configured to define the semantic richness indicators of the documents according to their specificity indicators. At this point, the flow of activity further branches according to the configuration of the search engine. If the search engine is configured to define the semantic richness indicators of the documents according to their complexity indicators, the calculator at block S442 calculates the average avg(SRc) of the complexity indicators $SRc_d$ of the corpus of documents, and saves it into the document richness repository.

The process then returns to the block S402 from the block S442 or directly from the block S440 when the search engine is not configured to define the semantic richness indicators of the documents according to their complexity indicators to repeat the same operations continually.

In a completely independent way, the process passes from block S444 to block S446 whenever the search engine receives a query submitted thereto by the browser of any client; in response thereto, the comparator determines the term frequency $tf_{t,q}$ of each term t of the query q. The comparator at block S448 calculates the tf-idf weight $w_{t,q}$ of each term t of the query q.

A loop is then performed for calculating the similarity index between each document of the corpus and the query by means of the VSM technique. The loop being at block S450, wherein a (current) document of the corpus is taken into account (starting from a first one in any arbitrary order). The comparator at block S452 calculates the tf-idf weight $w_{t,d}$ of each term t of the document d. The comparator at block S454 then calculates the similarity index SIM(q,d) between the query q and the document d (according to the angular difference of their vectors, depending on their terms t that are common).

In the solution according to an embodiment of the present disclosure, the flow of activity branches at block S456 according to the configuration of the search engine. If the search engine is configured to define the semantic richness indicators of the documents according to their specificity indicators, the adjuster at block S458 calculates the specificity factor $ADJs_d$ of the document d (equal to the pivot normalizer function of its specificity indicator $SRs_d$ extracted from the document richness repository). The adjuster at block S460 multiplies the similarity index SIM(q,d) of the document d with respect to the query q by the specificity factor $ADJs_d$. The process then continues to block S462 from the block S460 or directly from the block S456 when the search engine is not configured to define the semantic richness indicators of the documents according to their specificity indicators. At this point, the flow of activity further branches according to the configuration of the search engine. If the search engine is configured to define the semantic richness indicators of the documents according to their complexity indicators, the adjuster at block S464 calculates the complexity factor $ADJc_d$ of the document d (equal to the pivot normalizer function of its complexity indicator $SRc_d$ extracted from the document richness repository). The adjuster at block S466 multiplies the similarity index SIM(q,d) of the document d with respect to the query q (possibly already multiplied by specificity factor $ADJc_d$) by the complexity factor $ADJc_d$. The process then continues to block S468 from the block S466 or directly from the block S462 when the search engine is not configured to define the semantic richness indicators of the documents according to their complexity indicators. At this point, a test is made to verify whether a last document of the corpus has been processed. If not, the flow of activity returns to block S450 to repeat the same operations on a next document of the corpus. Conversely (once all the documents of the corpus have been processed), the loop is exit by descending into block S470.

At this point, as usual the search engine ranks the documents of the corpus in decreasing order for their (possibly updated) similarity indexes SIM(q,d), and selects the documents with the higher values thereof. The search engine at block S472 then returns the list of the (most relevant) documents so selected to the client (through the web server) as a response to the query q (with the browser of the client that receives this list and displays it onto its monitor, so as to allow the user to select the documents that are actually of interest, if any). The process then returns to the block S444 waiting for the submission of a further query.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for ranking a plurality of documents in a computing system. However, the documents may be in any number and of any type (for example, texts, images, audios, maps); moreover, the documents may be available in any way (for example, downloadable from any source, stored locally) in any computing system (see below).

In an embodiment, each of the documents comprises a plurality of document terms. However, the terms may be in any number and of any type (for example, words, phrases, metadata); moreover, the terms that are taken into account are all the ones of the document or only a part thereof (for example, by filtering out stop words, such a consisting of the most common words of the corresponding language).

In an embodiment, the method comprises the following steps under the control of a computing machine. However, these steps may be performed by any computing machine (see below).

In an embodiment, the method comprises receiving a query. However, the query may be received in any way (for example, entered manually, created automatically, pre-defined, either locally or remotely).

In an embodiment, the query comprises one or more query terms. However, the query terms may be in any number and of any type (either the same or different with respect to the document terms); moreover, the query may have any structure (for example, a simple list of keywords, keywords combined with any logical operators).

In an embodiment, the query terms are for selecting the documents. However, the query may be for any purpose (for example, for any information retrieval applications, such as searching of pages in Internet or books in libraries, any filtering applications, such as in anti-spam programs).

In an embodiment, the method comprises calculating corresponding similarity indexes between the query and the documents. However, the similarity indexes may be of any type (for example, with any continuous or discrete value).

In an embodiment, each of the similarity indexes is calculated according to a comparison between the query terms and the document terms of the corresponding document. However, the similarity index may be calculated in any way (for example, according to any algebraic model, such as the VSM, set-theoretic model, probabilistic model).

In an embodiment, the method comprises determining corresponding semantic richness indicators of the documents. However, the semantic richness indicators may be of any type (for example, quantitative metrics, qualitative levels) and they may be determined in any way (for example, according to the lexical variety, the syntactic complexity, the number of features, the semantic neighborhood density, the semantic diversity, the concreteness, the emotional valence, the imageability or any combination thereof).

In an embodiment, the method comprises adjusting the similarity indexes according to the corresponding semantic richness indicators. However, the similarity indexes may be adjusted in any way (for example, with a multiplicative function or an additive function, linearly or in any non-linear way, in a continuous or discrete way).

In an embodiment, the method comprises ranking at least part of the documents according to the corresponding similarity indexes that have been adjusted. However, the documents may be ranked in any number and in any way (for example, returning a list of the most relevant documents or them directly, selecting a single document only, simply ordering all the documents for future use).

In an embodiment, said step of determining corresponding semantic richness indicators comprises calculating each of the semantic richness indicators according to any rare terms of the corresponding document. However, the semantic richness indicator may be calculated in any way according to the rare terms (for example, based on any linear or non-linear function of their number, any measure of their specificity with respect either specifically to the corpus of documents or generally to the corresponding language).

In an embodiment, the rare terms consist of the document terms that are present in the documents with a frequency below a frequency threshold. However, the frequency threshold may be defined in any way (for example, according to any statistical parameter of the distribution of the document terms, set to a predefined value according to the corresponding language).

In an embodiment, said step of calculating each of the semantic richness indicators according to any rare terms of the corresponding document comprises calculating the frequency threshold according to a statistical analysis of a distribution of the document terms in the documents. However, the frequency threshold may be calculated in any way (for example, according to any number and type of statistical parameters combined in any way).

In an embodiment, said step of calculating each of the semantic richness indicators according to any rare terms of the corresponding document comprises calculating corresponding inverse frequency indicators of the document terms. However, the inverse frequency indicator of each term may be calculated in any way (for example, based linearly or non-linearly on $D/df_t$, $$D/(1+df_t), \frac{\max_{\{t' \in d\}} df_{t'}}{(1+df_t)}, (D-df_t)/df_t).$$

In an embodiment, each of the inverse frequency indicators is indicative of an inverse of a fraction of the documents wherein the corresponding document term is present. However, the inverse frequency indicator may be defined in any way (for example, with a logarithmic function, any other non-linear function or even a linear function).

In an embodiment, said step of calculating each of the semantic richness indicators according to any rare terms of the corresponding document comprises calculating a specificity threshold based on a central tendency parameter of the inverse frequency indicators. However, the central tendency parameter may be of any type (for example, any mean such as the arithmetic, geometric or harmonic one, the median, the mode); moreover, the specificity threshold may be based on the central tendency parameter in any way (for example, setting the specificity threshold equal to the central tendency parameter or to a percentage thereof).

In an embodiment, said step of calculating each of the semantic richness indicators according to any rare terms of the corresponding document comprises calculating each of the semantic richness indicators according to the inverse frequency indicators higher than the specificity threshold of the document terms that are present in the document. However, each semantic richness indicator may be calculated in any way (for example, according to the sum, the product or any other function of the corresponding inverse frequency indicators).

In an embodiment, said step of calculating corresponding inverse frequency indicators comprises applying a logarithmic transformation to the inverse frequency indicators. However, the logarithmic transformation may be of any type (for example, based on logarithms with any base).

In an embodiment, said step of determining corresponding semantic richness indicators comprises calculating each of the semantic richness indicators according to a syntactic complexity of the corresponding document. However, the semantic richness indicator may be calculated in any way according to the syntactic complexity (for example, based on any linear or non-linear function of any quantification thereof, such as based on complex syntactic units, verbs, prepositions, adverbs, adjectives or any combination thereof).

In an embodiment, said step of calculating each of the semantic richness indicators according to a syntactic complexity of the corresponding document comprises quantifying the syntactic complexity of each of the documents according to any complex syntactic units being present in the document. However, the complex syntactic units may be used in any way to quantify the syntactic complexity (for example, according to their number, applying a weight function based on any characteristics of the complex syntactic units such as their length).

In an embodiment, the complex syntactic units consist of any syntactic units having a complexity above a complexity threshold. However, the complex syntactic units may be defined in any way (for example, every verb phrases, every preposition phrases, verb/preposition phrases exceeding a predefined length or any combination thereof).

In an embodiment, said step of quantifying the syntactic complexity of each of the documents comprises identifying any verb phrases being present in each of the documents defining the corresponding complex syntactic units. However, the verb phrases of each document may be identified in any way (for example, by tagging the document in any way, such as with Markov models or dynamic programming methods, or more generally by any annotation, abstraction and/or analysis thereof).

In an embodiment, the method comprises calculating corresponding specificity components of the semantic richness indicators each according to the rare terms being present in the corresponding document. However, the specificity component of each document may be calculated according to its rare terms in any way (see above).

In an embodiment, the method comprises calculating corresponding complexity components of the semantic richness indicators each according to the syntactic complexity of the corresponding document. However, the complexity component of each document may be calculated according to its syntactic complexity in any way (see above).

In an embodiment, the method comprise adjusting each of the similarity indexes according to a combination of the corresponding specificity component and complexity component. However, each similarity index may be adjusted according to any combination of the corresponding specificity component and complexity component (for example, with a multiplicative function and/or an additive function, linearly and/or in any non-linear way).

In an embodiment, said step of determining corresponding semantic richness indicators of the documents comprises normalizing each of the semantic richness indicators according to a length indicator of the corresponding document. However, the length indicator of each document may be defined in any way (for example, according to the number of all its terms, its terms without the stop words, its phrases, its sentences) and it may be used to normalize the semantic richness indicator in any way (for example, as is or according to any function thereof, by applying it individually to at least part of the components of the semantic richness indicator or globally to the whole semantic richness indicator); in any case, this feature may also be omitted in a simplified implementation (for example, when the documents of the corpus have a uniform length).

In an embodiment, said step of adjusting the similarity indexes comprises multiplying each of the similarity indexes by at least one pivot normalizer function based on the corresponding semantic richness indicator. However, the pivot normalizer function may be in any number (for example, one for each component of the semantic richness indicator that are then combined in any way and/or by combining the components of the semantic richness indicator in any way and then applying a single pivot normalizer function to their combination) and of any type (for example, with or without the possibility of customizing its tuning parameter).

In an embodiment, said step of calculating corresponding similarity indexes comprises calculating the similarity indexes according to a Vector Space Model technique. However, he VSM technique may be of any type (for example, standard, generalized, topic-based).

In an embodiment, the method comprises returning a list of the documents that are ranked in response to the query. However, the list may be of any type (for example, identifying the documents by their addresses, such as URLs of pages in the Internet, or in any other way, such as by their name in a database, their path in a file system) and it may be returned in any way (for example, locally or remotely).

In an embodiment, the list is used to cause a display of at least part thereof in decreasing order of the corresponding similarity indexes being adjusted. However, the documents of the list may be displayed in any number (for example, divided in pages or all together) for any purpose (for example, for browsing, downloading, reading them).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides a computer program configured for causing a computing system to perform the above-mentioned method. An embodiment provides a computer program product comprising a computer readable storage medium having program instructions embodied therewith, the program instructions executable by a computing system to cause the computing system to perform the same method. However, the computer program may run on any computing system (see below). Moreover, the software program may be implemented as a stand-alone module, as a plug-in for a pre-existing software program (for example, the search engine) or even directly in the latter. In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

An embodiment provides a system comprising means configured for performing the steps of the above-mentioned method. An embodiment provides a system comprising a circuitry (i.e., any hardware suitably configured, for example, by software) for performing each step of the same method. However, the method may be performed on any server (for example, a physical computing machine, a virtual computing machine, a cloud service) for use by any number and type of clients (for example, desktops, laptops, smartphones, tablets) communicating among them via any network (for example, of local, wide area, global, cellular or satellite type) or on any stand-alone computing machine.

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The above-described features may be combined in any way. For example, possible combination of features described above may be the following: claim 2 with claim 1, claim 3 with claim 2, claim 4 with claim 3, claim 5 with claim 4, claim 6 with any claim from 1 to 5, claim 7 with claim 6, claim 8 with claim 7, claim 9 with any claim from 6 to 8 with the features of any claim from 2 to 5, claim 10 with any claim from 1 to 9, claim 11 with any claim from 1 to 10, claim 12 with any claim from 1 to 11, claim 13 with any claim from 1 to 12, claim 14 with instructions for performing the method of any claim from 1 to 13, claim 15 with means (or a circuitry) for performing each step of any claim from 1 to 13.

What is claimed is:

1. A method for ranking a plurality of documents in a computing system, each of the documents comprising a plurality of document terms, wherein the method comprises, under the control of a computing machine:

receiving a query comprising one or more query terms for selecting the documents;

calculating corresponding similarity indexes between the query and the documents, each of the similarity indexes being calculated according to a comparison between the query terms and the document terms of the corresponding document;

determining corresponding semantic richness indicators of the documents based on the plurality of document terms associated with each of the documents, wherein determining corresponding semantic richness indicators of the documents comprises calculating a specificity indicator and a complexity indicator for adjusting the similarity indexes of the documents,
wherein calculating the specificity indicator comprises identifying rare terms of a corresponding document based on the plurality of document terms and determining a density associated with the rare terms within the corresponding document, wherein the rare terms comprise the document terms that are present in the documents with a frequency below a frequency threshold, and
wherein calculating the complexity indicator comprises determining a number of verb phrases and a number of unique phrases associated with the corresponding document based on the plurality of documents to determine a syntactic complexity associated with the corresponding document;
adjusting the similarity indexes for each of the plurality of documents according to the corresponding semantic richness indicators based on a calculation combining the specificity indicator and the complexity indicator; and
ranking at least part of the documents for selection thereof according to the corresponding similarity indexes being adjusted.

2. The method according to claim 1, wherein said calculating each of the semantic richness indicators according to any rare terms of the corresponding document comprises:
calculating the frequency threshold according to a statistical analysis of a distribution of the document terms in the documents.

3. The method according to claim 2, wherein said calculating each of the semantic richness indicators according to any rare terms of the corresponding document comprises:
calculating corresponding inverse frequency indicators of the document terms, each of the inverse frequency indicators being indicative of an inverse of a fraction of the documents wherein the corresponding document term is present;
calculating a specificity threshold based on a central tendency parameter of the inverse frequency indicators; and
calculating each of the semantic richness indicators according to the inverse frequency indicators higher than the specificity threshold of the document terms being present in the document.

4. The method according to claim 3, wherein said calculating corresponding inverse frequency indicators comprises:
applying a logarithmic transformation to the inverse frequency indicators.

5. The method according to claim 1, wherein said determining corresponding semantic richness indicators comprises:
calculating each of the semantic richness indicators according to a syntactic complexity of the corresponding document.

6. The method according to claim 5, wherein said calculating each of the semantic richness indicators according to a syntactic complexity of the corresponding document comprises:
quantifying the syntactic complexity of each of the documents according to any complex syntactic units being present in the document, the complex syntactic units consisting of any syntactic units having a complexity above a complexity threshold.

7. The method according to claim 6, wherein said quantifying the syntactic complexity of each of the documents comprises:
identifying any verb phrases being present in each of the documents defining the corresponding complex syntactic units.

8. The method according to claim 1, wherein the method comprises:
calculating corresponding specificity components of the semantic richness indicators each according to any rare terms of the corresponding document, the rare terms consisting of the document terms being present in the documents with a frequency below a frequency threshold;
calculating corresponding complexity components of the semantic richness indicators each according to a syntactic complexity of the corresponding document; and
adjusting each of the similarity indexes according to a combination of the corresponding specificity component and complexity component.

9. The method according to claim 1, wherein said determining corresponding semantic richness indicators of the documents comprises:
normalizing each of the semantic richness indicators according to a length indicator of the corresponding document.

10. The method according to claim 1, wherein said step of adjusting the similarity indexes comprises:
multiplying each of the similarity indexes by at least one pivot normalizer function based on the corresponding semantic richness indicator.

11. The method according to claim 1, wherein said calculating corresponding similarity indexes comprises:
calculating the similarity indexes according to a Vector Space Model technique.

12. The method according to claim 1, wherein the method comprises:
returning a list of the documents being ranked in response to the query to cause a display of at least part thereof in decreasing order of the corresponding similarity indexes being adjusted.

13. A computer program product for ranking a plurality of documents each comprising a plurality of document terms, the computer program product comprising a computer readable storage medium having program instructions embodied therewith, the program instructions executable by a computing system to cause the computing system to:
receive a query comprising one or more query terms for selecting the documents;
calculate corresponding similarity indexes between the query and the documents, each of the similarity indexes being calculated according to a comparison between the query terms and the document terms of the corresponding document;
determine corresponding semantic richness indicators of the documents based on the plurality of document terms associated with each of the documents, wherein determining corresponding semantic richness indicators of the documents comprises calculating a specificity indicator and a complexity indicator for adjusting the similarity indexes of the documents,
wherein calculating the specificity indicator comprises identifying rare terms of a corresponding document based on the plurality of document terms and determining a density associated with the rare terms within the corresponding document, wherein the rare terms comprise the document terms that are present in the documents with a frequency below a frequency threshold, and wherein calculating the complexity indicator comprises determining a number of verb phrases and a number of unique phrases associated with the corresponding document based on the plurality of documents to determine a syntactic complexity associated with the corresponding document;

adjust the similarity indexes for each of the plurality of documents according to the corresponding semantic richness indicators based on a calculation combining the specificity indicator and the complexity indicator; and rank at least part of the documents for selection thereof according to the corresponding similarity indexes being adjusted.

14. A computing system for ranking a plurality of documents, each of the documents comprising a plurality of document terms, wherein the computing system comprises:

a circuitry for receiving a query comprising one or more query terms for selecting the documents;

a circuitry for calculating corresponding similarity indexes between the query and the documents, each of the similarity indexes being calculated according to a comparison between the query terms and the document terms of the corresponding document;

a circuitry for determining corresponding semantic richness indicators of the documents based on the plurality of document terms associated with each of the documents, wherein determining corresponding semantic richness indicators of the documents comprises calculating a specificity indicator and a complexity indicator for adjusting the similarity indexes of the documents, wherein calculating the specificity indicator comprises identifying rare terms of a corresponding document based on the plurality of document terms and determining a density associated with the rare terms within the corresponding document, wherein the rare terms comprise the document terms that are present in the documents with a frequency below a frequency threshold, and wherein calculating the complexity indicator comprises determining a number of verb phrases and a number of unique phrases associated with the corresponding document based on the plurality of documents to determine a syntactic complexity associated with the corresponding document;

a circuitry for adjusting the similarity indexes for each of the plurality of documents according to the corresponding semantic richness indicators based on a calculation combining the specificity indicator and the complexity indicator; and a circuitry for ranking at least part of the documents for selection thereof according to the corresponding similarity indexes being adjusted.

* * * * *